April 8, 1941.  C. M. HANSEN  2,237,735
MONOCABLE TRAMWAY
Filed Aug. 29, 1939
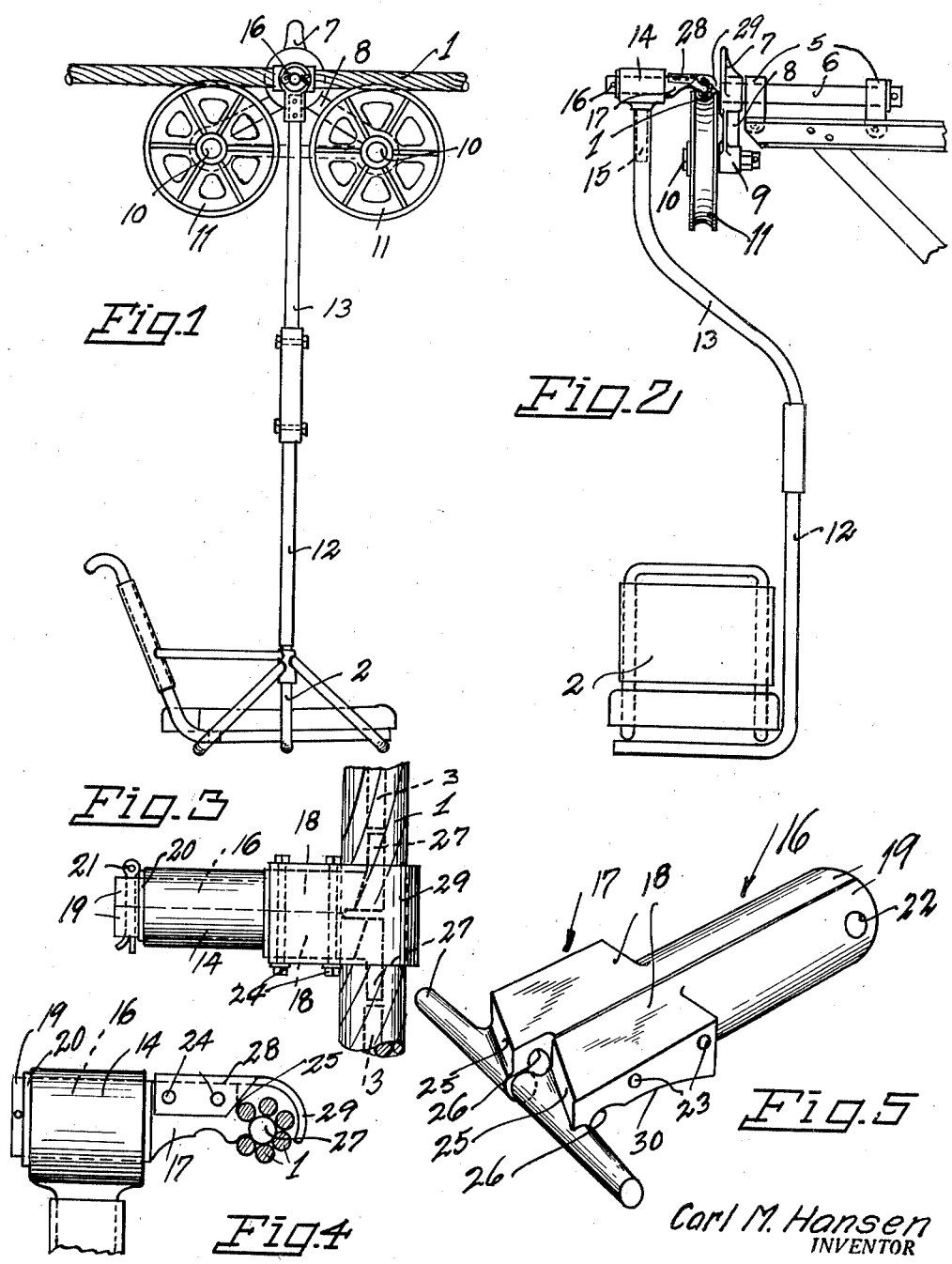
Carl M. Hansen
INVENTOR
BY Glenn L. Fish
ATTORNEYS Patented Apr. 8, 1941

2,237,735

UNITED STATES PATENT OFFICE 2,237,735

MONOCABLE TRAMWAY

Carl M. Hansen, Spokane, Wash.

Application August 29, 1939, Serial No. 292,418

3 Claims. (Cl. 104—201)

This invention relates to a monocable tramway of the type used for transporting materials in mines or other confined spaces or for transporting materials or passengers across rivers, gorges, or other locations where bridges cannot be conveniently erected or such transportation is only temporarily desired and it would not pay to go to the expense of erecting a permanent bridge.

One object of the invention is to provide a tramway having the carrier for freight or passengers so suspended from the flight of an endless cable that the carrier will be disposed directly under the cable and thus caused to be properly balanced when the carrier is loaded and in motion.

Another object of the invention is to provide the hanger of the carrier with the cable engaging means at its upper end having pivotal connection with the hanger and thus permit the hanger and the carrier to maintain a vertical position in which the articles or passengers occupying the carrier will not be liable to be dislodged from the carrier during transportation.

Another object of the invention is to provide a capable engaging member having one end constituting an axle for pivotally supporting the upper end of the hanger and its other end formed with a cable engaging portion so formed that it may be embedded in the cable and thus firmly held thereto and prevented from slipping out of engagement with the cable.

Another object of the invention is to so form the cable engaging end of the hanger head that when it is applied to the cable with portions embedded or centered therein, the portions embedded in the cable will extend longitudinally of the cable to such an extent that movement of the head out of its proper position relative to the cable will be prevented.

Another object of the invention is to provide a device of this character which is simple in construction, easy to erect, and not liable to get out of order when in use.

The invention is illustrated in the accompanying drawing, wherein:

Fig. 1 is a side elevation showing the flight of an endless cable and carrier suspended therefrom.

Fig. 2 is a view looking from the right of Fig. 1, and showing the carrier and its hanger in front elevation.

Fig. 3 is a top plan view of the cable engaging head or arm of the hanger.

Fig. 4 is a side elevation of the cable engaging head or arm, the cable being shown in transverse section.

Fig. 5 is a perspective view of the cable engaging head or arm.

The cable 1 from which the carrier 2 is suspended is an endless cable formed of strands of steel or other strong metal twisted about a rope core 3 in the usual manner. While only one flight of the cable has been shown, it is to be understood that this cable is trained about suitable pulleys to provide two flights spaced transversely from each other. At suitable points between the pulleys, the cable is supported by tower-supports, each of which has a horizontally extending arm 4 carrying bearings 5 in which a shaft 6 is rotatably mounted. This shaft projects beyond the free end of the arm 4 and at its outer end carries a disk 7 from which depend arms 8 terminating in bearings 9 through which are mounted the axles 10 of wheels 11. The cable rests upon these wheels, thus providing a rotatable support for the cable and permitting it to be easily shifted longitudinally during movement of the carrier from one end of the tramway to the other end thereof.

The carrier 2 has been shown in the form of a seat to be occupied by a passenger but it is to be understood that this merely illustrates one form of carrier and that others suitable for holding mine products or articles of any nature to be transported may be substituted in place of the seat. This carrier is carried by a hanger bar 12 having its upper portion or section 13 bent, as shown in Fig. 2, to dispose upper and lower ends of the hanger bar in transverse offset relation to each other and cause the carrier to be located directly under the cable and the wheels. At the upper end of the hanger bar is a sleeve 14 having a shank 15 tightly fitting within the upper end of the hanger bar and firmly secured therein. The sleeve extends transversely over the hanger bar as shown in Fig. 2, and receives the axle 16 of a cross head or arm 17 carried by the cable 1.

The cross head is constructed as shown in Fig. 5, and consists of companion members 18 having semi-circular shanks 19 cooperating with each other to form the axle 16. After the axle has been passed through the sleeve 14, a washer 20 is applied and a cotter key 21 then passed through registering openings 22 formed through the sections 19. Therefore, the sleeve will be held about the axle and may turn thereon to permit the weight of the hanger and the carrier to maintain the hanger in a vertical position in which the carrier will be so supported that a person will not be liable to fall out of the carrier. The portion of the cross head projecting from the inner end of the sleeve is formed with openings 23 through which bolts 24 pass to firmly hold the two sections in close contacting engagement with each other and outer ends of the head forming sections are shaped to provide shoulders 25 against which certain strands of the cable bear, as shown in Fig. 3. There has also been provided a passage 26 through which one strand of the cable passes. The passage 26 is open along its lower side for the full width of the member 18 across which it extends and is disposed close to the cable-engaging end thereof so that when two strands of a cable are in engagement with the shoulders 25 one of the strands may have a portion pass through the passage 26 without being distorted. Each section of the cross head carries at its outer end a side arm or pin 27. These pins are in alignment with each other and taper somewhat toward their outer ends, and cooperate with each other to form an anchoring bar extending transversely of the cross head and embedded in the cable axially thereof.

When the tramway is installed, the cable supports are erected in their proper positions and the endless cable trained about the pulleys on both ends of the line with the flights of cable resting on the wheels II. When the strands of the cable are pried apart by inserting a spreader tool or twisting the cable and a portion of the core removed, one of the companion members 18 of the cross head is inserted into the cable between the strands with its extension 27 filling the space previously occupied by the core. After this member has been placed the other companion member is inserted in the space between the next strands and takes the same position as the first. After the members 18 are in place the spreader is removed from the cable permitting it to return to its normal position. The strands of the cable conform to the angles and grooves provided on the companion members and snugly grip the portions 27 holding the cross head in position without materially increasing the size of the cable. Since the side arms 27 are embedded in the cable, with one strand passing through the passage 26 and portions of the side arms at ends of the members 18 gripped between strands of the cable, as shown in Figure 4, the cross head 17 will be maintained in a horizontal position and prevented from moving about the cable circumferentially thereof when subjected to the weight of a person or load carried by the carrier. It should also be noted that since the pins 27 project from opposite sides of the cross arm for an appreciable extent, they will brace the cross arm against transverse tilting and prevent the cross head formed by the pins from working out of the cable.

A cap 28 is secured in straddling relation with the cross bar by the bolts 24 and has a bill 29 extending about the cable as a shield and also as a safety means in case the load carried should receive a sudden jolt. It is merely necessary to load the carrier or for a passenger to occupy the carrier and the cable is then set in motion to move the carrier between the pulleys. The recess 30 provides clearance for the wheels as the cross bar passes over them.

Having thus described the invention, what is claimed is:

1. In a monocable tramway, a cable movable longitudinally and formed of twisted strands, a carrier, a hanger for said carriage having a bearing at its upper end, a cross arm having an axle portion journaled through said bearing and an outer portion projecting from said bearing toward the cable, said cross arm consisting of companion longitudinally extending side sections having inner confronting faces engaging each other, stems at ends of the outer portions projecting laterally therefrom in alignment with each other and forming a cross head embedded in said cable to anchor the cross arm to the cable, a cap straddling the outer portion of said cross arm and having a tongue curved longitudinally to extend partially about the cable, and fasteners extending through the cap and cross arm to hold the cap in place and hold the side sections of the cross arm in engagement with each other.

2. In a monocable tramway, a cable movable longitudinally and formed of twisted strands, a carrier, a hanger for said carrier having a bearing at its upper end, a cross arm having an axle portion journaled through said bearing and an outer portion projecting from said bearing toward the cable, said cross arm consisting of companion longitudinally extending side sections having inner confronting faces engaging each other, stems at ends of the outer portions projecting laterally therefrom in alignment with each other and forming a cross head embedded in said cable to anchor the cross arm to the cable, end faces of the side sections above said stems being disposed diagonally transversely of the side sections in offset relation to each other to provide shoulders for engagement by strands of said cable, a cap extending across the outer portions of the side sections and having depending side flanges and the side sections to hold the cap in place and the side sections in engagement with each other, said cap having a tongue curved longitudinally for extending about said cable, and a cotter key passing through axle forming portions of the side sections to hold the same in close contacting engagement with each other and retain the axle in place through the sleeve.

3. A device for suspending an article from a cable of twisted strands said device comprising companion longitudinally extending side sections secured in side by side relation to each other, the said side sections having cable engaging ends each formed with a diagonally extending shoulder across its outer end for engaging a side portion of a strand of the cable and adjacent its outer end having its under face formed with a strand-receiving passage extending its full width and along its bottom the shoulders and the passages of the said sections being parallel to each other and the passage of one section in alinement with the shoulder of the other section, and fingers carried by the said sections and projecting laterally from outer sides of the cable-engaging ends of the said sections in alinement with each other for extending longitudinally in a cable axially thereof and having portions extending across ends of the sections directly under the shoulders for engaging under strands engaged by the shoulders.

CARL M. HANSEN.